Patented Nov. 10, 1925.

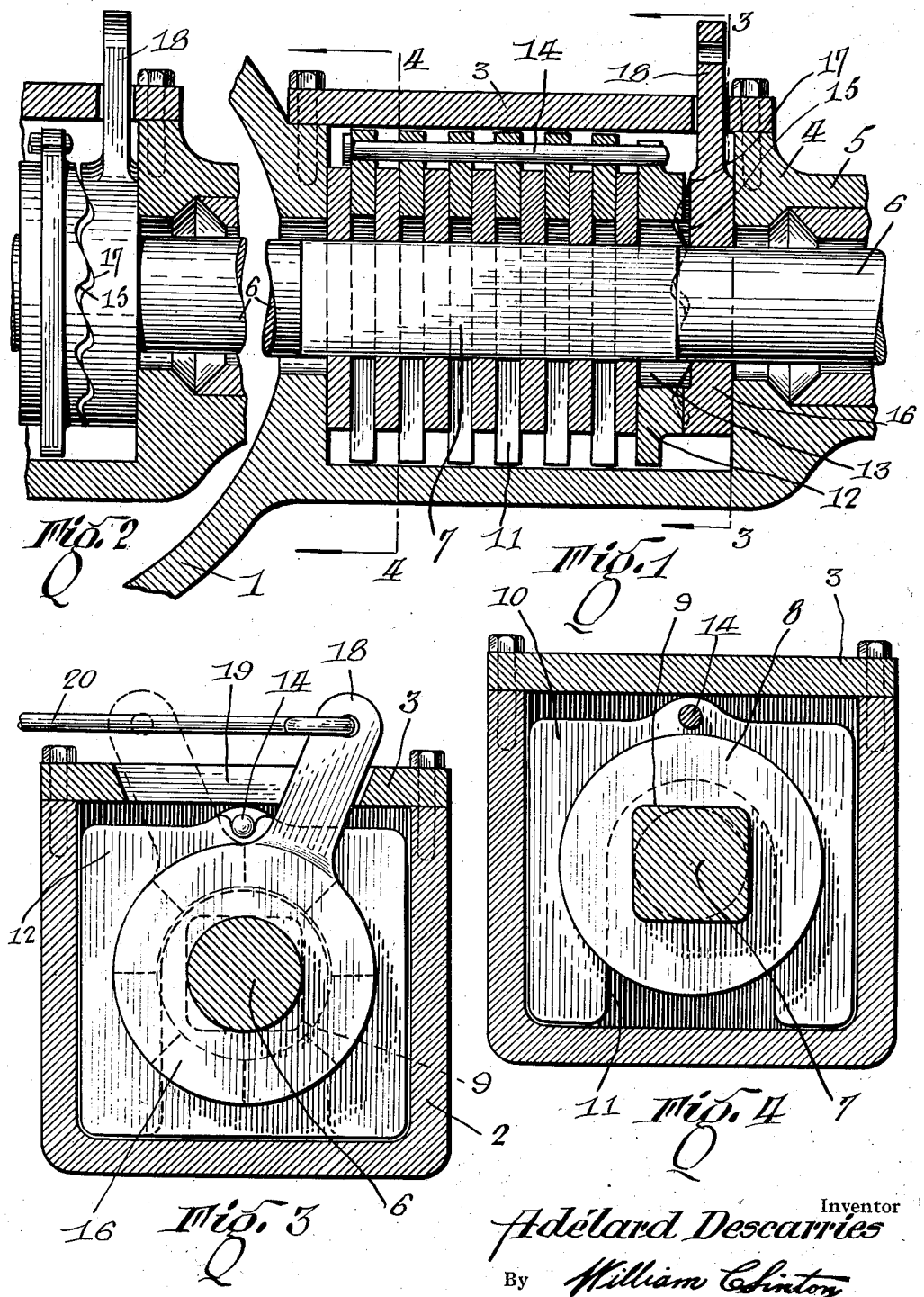

1,561,413

UNITED STATES PATENT OFFICE.

ADÉLARD DESCARRIES, OF MONTREAL, QUEBEC, CANADA.

MULTIPLE-DISK BRAKE.

Application filed December 12, 1924. Serial No. 755,567.

*To all whom it may concern:*

Be it known that I, ADÉLARD DESCARRIES, a subject of the King of Great Britain, residing at Montreal, Province of Quebec, Canada, have invented certain new and useful Improvements in Multiple-Disk Brakes; and I do hereby declare that the following is a full, clear, and exact description of the invention, such as will enable others skilled in the art to which it appertains to make and use the same.

The present invention pertains to a novel multiple disk brake adapted for use wherever the regulation of the speed shaft is desired.

The principal object of the invention is the provision of a device of this character which is simple in construction and effective in operation. The device comprises a plurality of spaced friction disks surrounding the squared portion of a shaft and rotatable therewith. Alternating with the disks are provided yokes which are free from the shaft. The square part of the shaft also is surrounded by a loose plate having a corrugated face. The rounded part of the shaft carries a loose collar having a complementary corrugated face. A suitable device is provided for rotating the collar independently of the shaft, whereby the corrugated surfaces are relatively shifted, thereby causing compression of the disks and yokes and consequently impeding the rotation of the shaft.

The invention is fully disclosed in the following description and in the accompanying drawings in which:

Figure 1 is a longitudinal section of a brake constructed in accordance with the invention;

Figure 2 is a fragmentary detail of Figure 1, showing a portion thereof in elevation;

Figure 3 is a section on the line 3—3 of Figure 1; and,

Figure 4 is a section on the line 4—4 of Figure 1.

Reference to these views will now be made by means of like characters which are employed to designate corresponding parts throughout.

The brake as shown in Figure 1 is constructed adjacent the transmission casing 1 on which is formed a rectangular housing 2 having a removable cover 3. It is to be understood in this connection that the casing, for containing the multiple disks, may be located wherever needed. The housing is closed at the end opposite the transmission casing by means of a wall 4 from which extends a sleeve 5 surrounding the shaft 6 which extends longitudinally through the housing 2 and into the transmission casing 1, as clearly shown in Figure 1. A portion of the shaft is squared as at 7 from the transmission casing 1 to a point slightly in advance of the wall 4, as also shown in Figure 1.

The squared part is surrounded by a number of friction disks 8 formed preferably of hard metal and spaced from one another at equal distances along the shaft. Each such disk is formed with a square aperture 9, the edges of which engage the periphery of the shaft and thereby cause the disks to be rotated with the shaft. These disks are alternated with yokes 10 formed preferably of a softer metal and fitting rather closely in the spaces between the disks 8. These yokes are substantially U-shaped, each having a recess 11, the edges of which are free from the shaft, as shown in Figure 4. The disk 8 nearest the wall 4 is engaged by a square plate 12 surrounding the shaft and formed with a central opening 13, the edges of which are spaced from the shaft. A pin 14 is passed through the plate 12 and the yokes 10, having one end resting on the top of the plate and the other end headed against one of the yokes. The surface of the plate facing the wall 4 is circularly corrugated, as indicated by the numeral 15 in Figures 1 and 2.

Adjacent this corrugated face and surrounding the round part of the shaft 6 is disposed a collar 16, the surface thereof facing the corrugations 15 being formed with similar corrugations 17. An arm 18 extends from the collar through a transverse slot 19 cut in the cover 3. A link 20 is attached to the arm and is extended to a suitable lever by means of which it may be drawn to bring the arm to any point intermediate the position shown in the full and dotted lines in Figure 3.

Whether it is desired to stop or slow down the rotation of the shaft, the link 20 is shifted in the manner described. The corrugated sections 15 and 17 engage one another, and the movement of the portion 17 around the part 15 moves the plate 12 against the adjacent disk. The disks 8 and yokes 10 are thereby brought into close engagement, increasing the friction on the disks which rotate with the shaft, and consequently reducing the speed of the latter.

If the soft metal yokes 10 become worn, the cover 3 is removed and the pin 14 is raised, carrying all the yokes with it. The yokes are then readily removed from the pin and replaced by new ones.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A multiple disk brake comprising in combination with a shaft having a squared portion, a plurality of disks mounted on said squared portion to rotate therewith, yokes alternating with said disks and free from the shaft, and means for compressing said disks and yokes.

2. A multiple disk brake comprising in combination with a shaft having a squared portion, a plurality of disks mounted on said squared portion to rotate therewith, yokes alternating with said disks and free from the shaft, a plate loosely surrounding said squared portion and having a corrugated face, a collar surrounding the round portion of the shaft and having a corrugated face adapted to engage the first corrugated face, and means for turning said collar independently of the shaft.

3. A multiple disk brake comprising in combination with a shaft having a squared portion, a plurality of disks mounted on said squared portion to rotate therewith, yokes alternating with said disks and free from the shaft, means for compressing said disks and yokes, and a pin passed through said yokes, said pin lying outside the periphery of the disks.

4. A multiple disk brake comprising in combination with a shaft having a squared portion, a plurality of disks mounted on said squared portion to rotate therewith, yokes alternating with said disks and free from the shaft, a plate loosely surrounding said squared portion and having a corrugated face, a collar surrounding the round portion of the shaft and having a corrugated face adapted to engage the first corrugated face, means for turning said collar independently of the shaft, and a pin passed through said plate and yokes, said pin lying outside the periphery of the disks.

5. A multiple disk brake comprising in combination with a shaft having a squared portion, a plurality of disks mounted on said squared portion to rotate therewith, yokes alternating with said disks and free from the shaft, a plate loosely surrounding said squared portion and having a corrugated face, a collar surrounding the round portion of the shaft and having a corrugated face, a pin passed through said plate and yokes, said pin lying outside the periphery of the disks, a housing enclosing said shaft and parts surrounding the shaft, said housing having a removable cover with a slot formed therein, an arm extending from said collar and passing through said slot, and a link attached exteriorly to said arm for turning the collar relatively to the shaft.

In witness whereof I have hereunto set my hand.

ADÉLARD DESCARRIES